US011033893B2

(12) United States Patent
Vanier et al.

(10) Patent No.: US 11,033,893 B2
(45) Date of Patent: Jun. 15, 2021

(54) MULTI-COLUMN CONTINUOUS RESIN REGENERATION SYSTEM

(71) Applicants: Jay Vanier, Salina, KS (US); Russell D. Pool, San Antonio, TX (US)

(72) Inventors: Jay Vanier, Salina, KS (US); Russell D. Pool, San Antonio, TX (US)

(*) Notice: Subject to any disclaimer, the term of this patent is extended or adjusted under 35 U.S.C. 154(b) by 0 days.

(21) Appl. No.: 16/924,369

(22) Filed: Jul. 9, 2020

(65) Prior Publication Data

US 2021/0008539 A1 Jan. 14, 2021

Related U.S. Application Data

(60) Provisional application No. 62/872,093, filed on Jul. 9, 2019.

(51) Int. Cl.
| | |
|---|---|
| *C02F 1/42* | (2006.01) |
| *B01J 49/85* | (2017.01) |
| *B01J 49/70* | (2017.01) |
| *B01J 47/028* | (2017.01) |
| *B01J 41/04* | (2017.01) |
| *B01J 41/12* | (2017.01) |
| *B01J 39/04* | (2017.01) |
| *B01J 39/18* | (2017.01) |
| *C02F 1/00* | (2006.01) |

(Continued)

(52) U.S. Cl.
CPC ............ *B01J 49/85* (2017.01); *B01D 15/203* (2013.01); *B01D 15/362* (2013.01); *B01D 15/363* (2013.01); *B01J 39/04* (2013.01); *B01J 39/18* (2013.01); *B01J 41/04* (2013.01); *B01J 41/12* (2013.01); *B01J 47/028* (2013.01); *B01J 49/08* (2017.01); *B01J 49/70* (2017.01); *C02F 1/008* (2013.01); *C02F 1/42* (2013.01); *C02F 2001/422* (2013.01); *C02F 2001/425* (2013.01); *C02F 2209/04* (2013.01); *C02F 2209/06* (2013.01); *C02F 2209/10* (2013.01); *C02F 2209/40* (2013.01); *C02F 2303/16* (2013.01)

(58) Field of Classification Search
CPC . B01J 49/85; B01J 49/08; B01J 47/028; B01J 49/70; B01J 49/80; C02F 1/008; C02F 1/42; C02F 2209/10; C02F 2001/422; C02F 2209/04; C02F 2209/06; C02F 2209/40; C02F 2001/425; C02F 2303/16; C02F 9/00; C02F 2209/003; C02F 2209/05; C02F 2209/055
USPC .................................................. 210/340, 662
See application file for complete search history.

(56) References Cited

U.S. PATENT DOCUMENTS

| | | | | |
|---|---|---|---|---|
| 5,069,779 | A | * | 12/1991 | Brown ...................... C02F 1/42 210/87 |
| 2004/0045888 | A1 | * | 3/2004 | Miers, Jr. ............... B01J 47/028 210/264 |

FOREIGN PATENT DOCUMENTS

WO    WO-2014064754 A1 *  5/2014  ............. B01J 49/08

* cited by examiner

*Primary Examiner* — Matthew O Savage
(74) *Attorney, Agent, or Firm* — Dale J. Ream

(57) ABSTRACT

A continuous resin regeneration system includes a process by which resin in need of being recharged is continuously recharged and cleaned with a plurality of two-set filtration columns so that resin regeneration and the flow of influent is continuous and interrupted. Downstream filtration columns also undergo this cycling but at slower and related rates as the first column with the dirtiest water will naturally degrade resin faster than the downstream columns. Contaminated influent is cleaned by the continuously recharged resin in multiple column sets. The degree of cleaning of (Continued)

earlier filtration columns affects the resin flow rate of later filtration columns.

10 Claims, 4 Drawing Sheets

(51) Int. Cl.
*B01D 15/36* (2006.01)
*B01D 15/20* (2006.01)
*B01J 49/08* (2017.01)

MULTI-COLUMN CONTINUOUS RESIN REGENERATION SYSTEM

REFERENCE TO RELATED APPLICATIONS

This application claims the benefit of provisional patent application 62/872,093 filed Jul. 9, 2019 and titled Continuous Resin Regeneration System, which claims the priority of non-provisional patent application Ser. No. 16/179,310 filed Nov. 2, 2018 and titled Continuous Resin Regeneration System which claims the benefit of provisional patent application U.S. Ser. No. 62/622,248 filed Jan. 26, 2018 titled Continuous Resin Regeneration System all of which are incorporated in their entirety herein by reference.

BACKGROUND OF THE INVENTION

This invention relates to resin regeneration systems and, more particularly, to a multi-column continuous resin regeneration system in which influent water in need of cleaning or filtration is flowed through filtration columns of resin so long as the resin within a first column is not degraded beyond a predetermined amount and, if so, into a second column of like resin type having sufficiently charged resin. During an instance where influent is flowed into a second column of like resin, resin in the first column is recharged.

Resins are used to draw charged particles out of waste water in various applications (water is considered a byproduct in many industrial settings). Water is passed over resins which draw out the particles and the particles are then recovered from the resins in filtration processes. Although such systems are presumably effective for recycling or recharging resins, the resins in the past have been used in "batches" as the resins have a regeneration cycle and must be replaced with new resin (and the used resin can be removed offsite to be "cleaned"). The problem is, then, the down time while changing the resin. In other words, in all existing resin applications, the resin is used in a batch system—meaning that the resins are used until the charged resin can no longer attract material dissolved in the water. At this point, the resin must be removed and replaced with suitable charged resin.

Therefore, it would be desirable to have a resin regeneration system in which a resin type (e.g. an anion resin or a cation resin) are associated with at least a pair of filtration columns at each stage of filtration, such as a first anion column and a second anion column so that if the anion resin within the first anion column is detected below a predetermined level, the influent is automatically flowed into the second anion column while the degraded anion resin in the first anion column is recharged. The filtered influent is then passed to a cation column having a similar assembly.

The primary novelty of the present invention is the continuous flow of influent and regeneration of resin (rather than batch processing which has repeated downtime for replacement of resin).

SUMMARY OF THE INVENTION

Water is generally considered by industry to be a waste product. The control of water management costs is of increasing importance in all fields.

The utilization of charged resin has been implemented in small lot systems. The reason for limited utilization is that resin can only be used to the point at which the resin's capability to draw charged material out of the water—depleted by blinding of the charge by particulates removed from the water—limits its usable life.

A system is proposed that will allow the resin to be used for a prolonged period of continuous utilization.

A primary object of the present invention is the recharging of degraded resin as required without halting or stopping the filtration process. That being said, the resin replacement would only be necessary if the resin particle size has been reduced through degradation (also referred to as degeneration). The key to maintaining maximum efficiency in a filtration process is to regenerate the resin without ever stopping the filtration cycle. The present system allows for continuous cleaning and recharging of resin while using the same resin for an extended period of time. However, degradation of the resin will require replacement at some point in time.

The system will be utilized using two types of resin. Ion exchange resins are classified as cation exchangers which exchange positively charged ions and anion exchangers that exchange negatively charged ions. Preferably, the present invention uses a Weak Acid Cation (WAC) resin and a Weak Base Anion Resin.

The ion-exchange system according to the present invention is summarized as follows:

Water is pumped from the settling tank through the ion exchange system (described below). The system includes sets of resin filled columns, including anion columns and cation column sets. Standard operations may require 6 sets of columns: 3 anion column sets and 3 cation column sets, there are two or more columns filled with a respective resin. These columns are agitated by mechanical means (distributive plates or stirrers) or non-mechanical means (ultrasonic).

A column set includes two or more columns so that a waste stream can be processed through one column while the other column within the set can be in regeneration mode. The control system constantly monitors pH, total dissolved solids (TDS), and oxidation reduction potential (ORP). User adjustable parameters/set points are constantly compared to the parameters at the exit of each column so as to allow the control system to automatically actuate respective 3-way valves to direct the processed waste stream to an appropriate column within a column set while the other of the columns goes into regeneration mode. Thus, continuous flow is maintained while resin is also being constantly regenerated.

When resin within a column requires regeneration, this regeneration takes place within the same column. Specifically, when a column's ph, ORP, and TDS exceed a user defined amount, the control system is configured to automatically actuate a respective 3-way valve to direct the water stream into the other column of a column set and prepare the one with spent resin for regeneration. The regeneration of the resin occurs automatically and under the control of the control system. Resin regeneration begins with a dewatering of the column being regenerated, i.e. any water still in said column is pumped back to the settling tank. Once the resin is regenerated, the degenerate column can be brought back online.

Therefore, a general object of this invention is to provide a resin regeneration system in which each resin filtration column has at least a two-set construction in which one resin casing may be taken offline to recharge its resin while an auxiliary casing having a respective resin can be placed online for cleaning influent. In this way, a column set is never completely offline and the process of cleaning the contaminated stream of liquid is continuous and never interrupted.

Another object of this invention is to provide a resin regeneration system, as aforesaid, that provides continuous recycling of resin in a filtration system rather than batch processing.

Yet another object of this invention is to provide a resin regeneration system, as aforesaid, that increases efficiency and profit of a filtration system.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
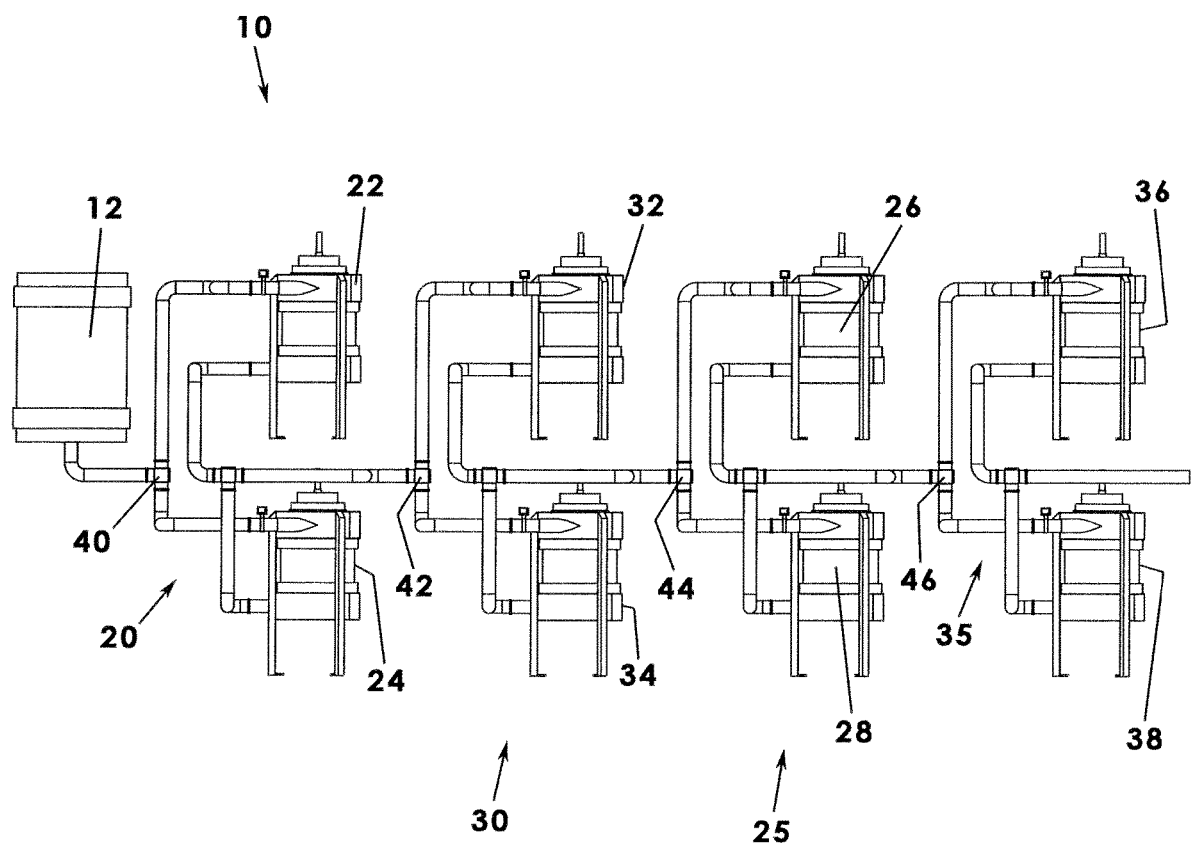
FIG. 1 is a front view of the resin regeneration sets coupled together with piping according to a preferred embodiment of the present invention.
Figure 2:
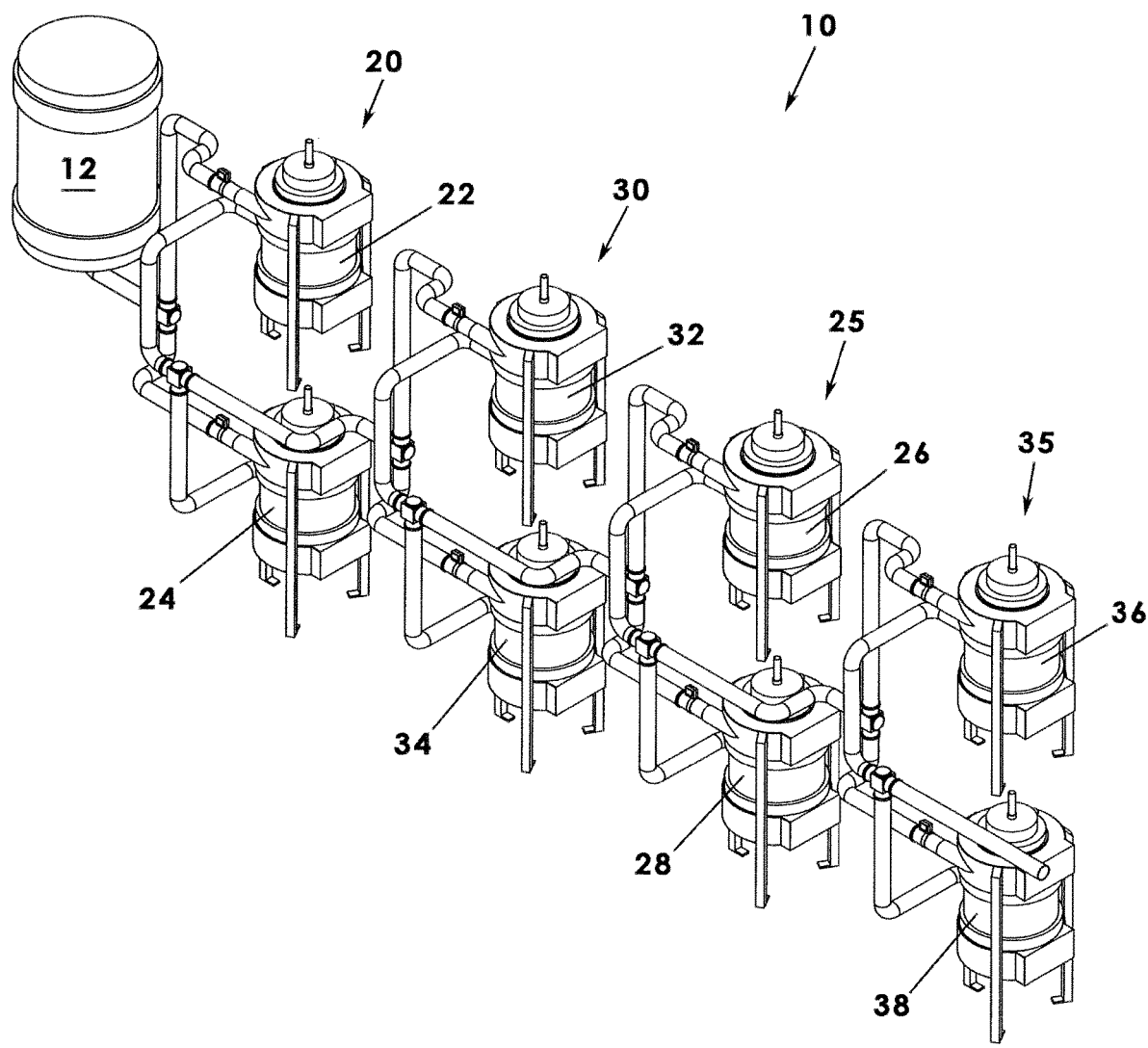
FIG. 2 is a perspective view of the resin regeneration system as in claim 1.
Figure 3:
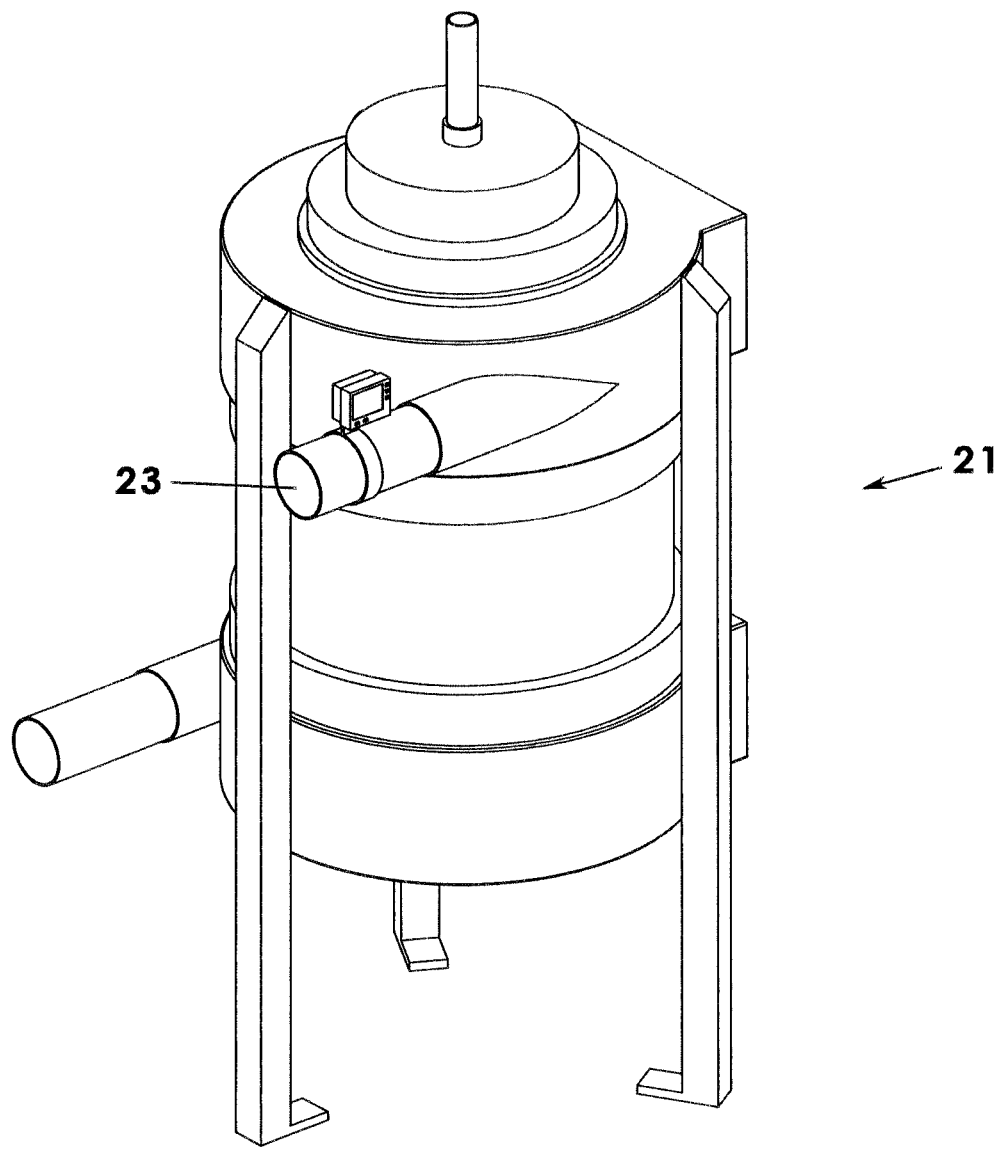
FIG. 3 is an isolated enlarged view of a respective casing of a resin column taken from the system as in FIG. 2.
Figure 4:
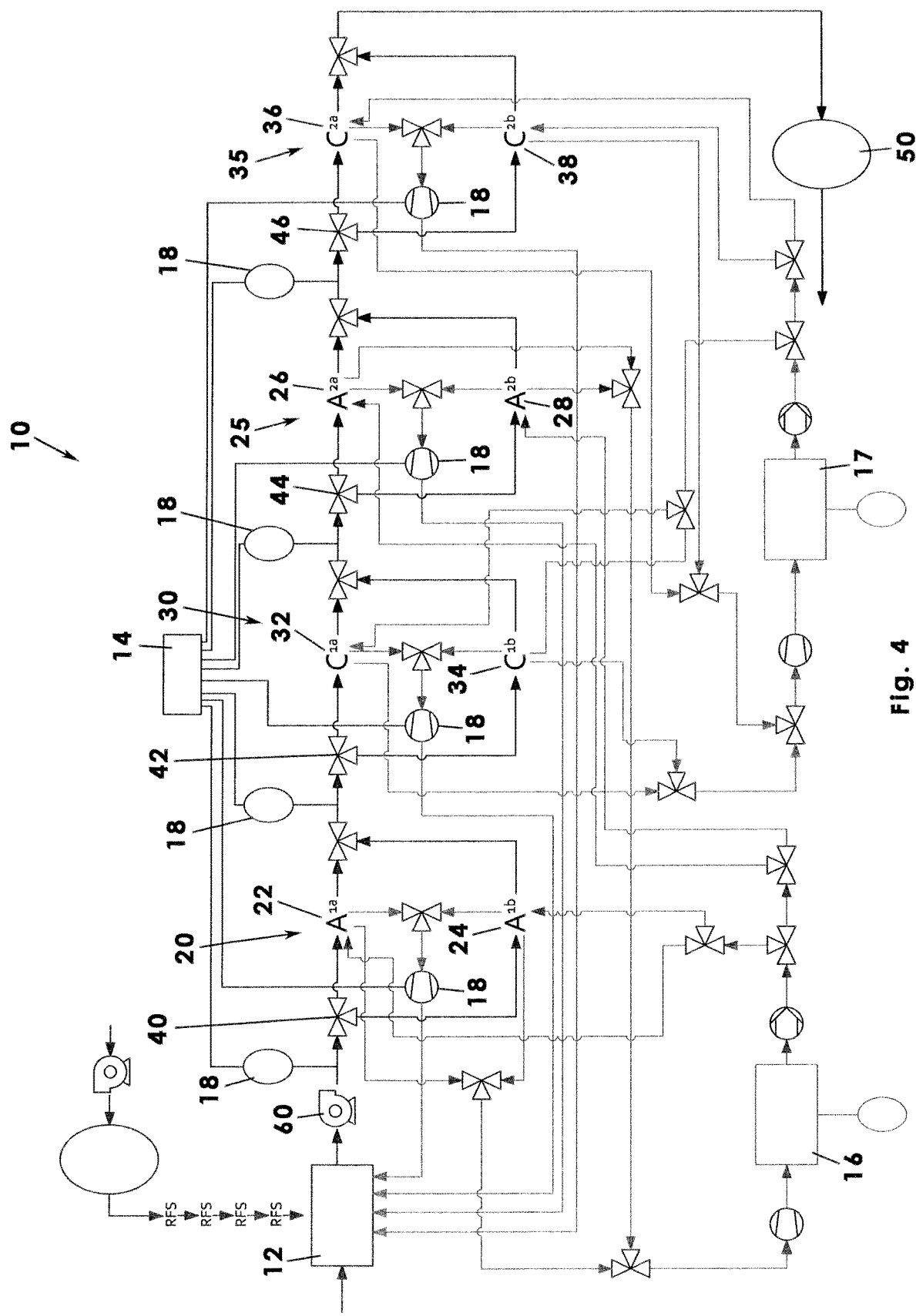
FIG. 4 is a flowchart illustrating the invention according to the present invention according to a preferred embodiment of the present invention.

A continuous resin regeneration system according to a preferred embodiment of the present invention will now be described with reference to FIGS. 1 to 4 of the accompanying drawings. The continuous resin regeneration system 10 includes a first anion column set 20, a first cation column set 30, a second anion column set 25, and a second cation column set 35. It is understood that each column set includes at least two filtration columns and, in some applications, more than two.

For clarity of terminology in the present application, the first anion column set 20 includes a first anion column 22 notated in the drawings as $A^{1a}$ and a second anion column 24 notated in the drawings as $A^{1b}$. Similarly, the first cation column set 30 includes the first cation column 32 notated in the drawings as $C^{1a}$ and a second cation column 34 notated in the drawings as $C^{1b}$. Then, the second anion column set 25 includes a first anion column 26 notated in the drawings as $A^{2a}$ and a second anion column 28 notated in the drawings as $A^{2b}$. Similarly, the second cation column set 35 includes a first cation column 36 notated in the drawings as $C^{2a}$ and a second cation column 38 notated in the drawings as $C^{2b}$. Each anion column includes an anion resin within an interior area defined thereby and each cation column includes a cation resin within an interior area defined thereby.

For context, raw untreated water akin to sewage may flow into a water filtration system referred to as a Reverse Flow System (RFS) and the resultant water stream held in an RFS effluent tank 12 (also referred to as a settling tank). It is understood that the influent may be evaluated by the presence of sensors and other instrumentation for generating data relative to total dissolved solids (TDS), pH, total dissolved solids (TDS), total sustained solids (TDS), oxidation reduction potential (ORP), or the like. Various predetermined values regarding a filtration process may be derived from these measurements as will be described later. It is from this effluent tank 12 (also referred to as a settling tank) that a water stream (aka a waste stream) flows into the resin regeneration system 10 described herein. It is understood that the effluent tank 12 and the anion columns referred to herein are in fluid communication together with piping and to which column the water stream is permitted to flow is regulated by one of a plurality of 3-way valves (referred to as a "valve" or a "control valve"). In other words, a first control valve 40 is positioned in or in communication with respective piping intermediate the effluent tank 12 and the first anion column set 20. The incoming water stream from the effluent tank 12 is then permitted to flow (such as via a pump 60) into a water inlet of either the first anion column 22 or a water stream inlet of the second anion column 24 of the first anion column set 20, depending on which has appropriately charged resin by which to filter or clean the incoming flow. In like manner, a second control valve 42 may be positioned in or in communication with respective piping intermediate the first anion column set 20 and the first cation column set 30 and so on with a third control valve 44, fourth control valve 46, and so on if more column sets are used.

Decisions regarding which column of a column set to direct the water stream is determined by instrumentation 18 associated with respective columns such as sensors being in communication with the column set itself (and its columns), adjacent piping, or the like. For instance, the charge or other measure of the efficacy of resin filling a respective column may be measured and compared with a predetermined value (i.e. determined by a user before actuating the system). Then, if a measured value of a first respective column is below the predetermined value, then the respective control valve may be actuated to direct the stream into the second respective column. This may be referred to as determining the functionality or suitability (or the "ability) of the existing resin to clean the water stream. It will be understood that the instrumentation associated with each column may be in data communication, whether with wires or wirelessly, to a master controller 14 (also referred to as a control system) such as a remote computing system, software application, or other computing device such that decisions and appropriate actuations of respective 3-way valves may be fast and seemingly automatic so as to make the filtration system run continuously. The master controller 14 may have a processor and a memory having programming executable by the processor so as to effectuate the system 10 described herein. And, of course, the plurality of sensors may be in fluid communication with the water stream itself—so as to read them.

The resins discussed in this specification are ion-exchange resins. Ion-exchange resins are widely used in purification and decontamination processes such as in water purification systems. A resin may include an insoluble matrix of beads or microbeads. Preferably, the first resin discussed below is a weak cation resin composition and the second resin is a weak base anion resin. The concept of a resin regeneration system includes a reversible chemical reaction wherein an ion from a liquid stream is exchanged for a similarly situated ion attached to an immobile solid particle. The ion exchange process effectively removes sodium, arsenic, heavy metals, nitrate, radium, salts, boron, uranium, gases and other elements found in produced water.

It is observed that the first anion column set 20 includes both a first anion column 22 containing an anion resin and a second anion column 24 containing an anion resin. In actual construction, the first anion column 22 may include a first casing 21 having a continuous side wall enclosed by top and bottom walls that collectively define a first interior area. The first anion column 22 may include a first inlet 23, preferably in operable communication with the top wall, for receiving a water stream into the first interior area. It is understood that an anion resin already positioned inside the interior area and in fluid communication with the instrumentation 18 that will determine if the first anion column 22 will be utilized. It is understood that the first resin will be degraded or degenerated as the first resin cleans a contaminated water stream flowing through the first anion column 22. It will be understood that each of the other columns also include a casing, inlet, and outlets; however, only the first casing 21 is numbered for clarity and simplicity.

In an instance where a water stream from the effluent tank 12 was passed through the first anion column 22 as described above, then the processed water stream proceeds to the first cation column set 30 as will be described later. However, if the instrumentation evaluating resin life determined the anion resin in the first anion column was insufficient (i.e. below a predetermined level), the respective valve is actuated to direct the stream to the second anion column 24 and, by so doing, gives the anion resin in the first anion column 22 opportunity to be recharged. In the meantime, the water stream is directed into and through the second anion column 24 which also includes charged anion resin to filter or clean the water stream. The second anion column 24 associated with the first anion column set 20 may include a casing (unnumbered) having a construction substantially similar to that described above. In an instance where a water stream from the effluent tank 12 was passed through the second anion column 24 associated with the first anion column set 20 as described above, then the processed water stream proceeds to the first cation column set 30 as will be described below.

Following processing through either the first anion column 22 or second anion column 24 associated with the first anion column set 20, the processed water stream is piped to the first cation column set 30 illustrated in the drawings at $C^{1a}$. In a similar manner as that described above, instrumentation will determine if the cation resin situated in the first cation column 32 meets a predetermined threshold parameter and, if so, the second control valve 42 is actuated to permit processed water stream into the first cation column 32 associated with the first cation column set 30. Otherwise, the second control valve 42 is actuated to permit the processed water stream into the second cation column 34 associated with the first cation column set 30. Operation of each cation column is substantially similar to the operation of the anion columns described above except that the water stream is passing across or being cleaned by cation particles rather than anion particles. Also, it is understood that each cation column may also include a casing (unnumbered) having walls that, together, may form an interior space. When processing through the first cation column set 30 is complete, the further processed effluent water stream is permitted to flow downstream to the third control valve 44 regulating the second anion column set 25, (which includes a first anion column 26 (shown as $A^{2a}$) and a second anion column 28 (notated as $A^{2b}$). Each of the columns associated with the second anion column set 25 function in a manner substantially similar to that of the first anion column set 20 and, therefore, will not be described again here. Further still, when processing through the second anion column set 25 is complete, the further processed effluent water stream is permitted to flow downstream to the fourth control valve 46 regulating the second cation column set 35, (which includes a first cation column 36 (shown as $C^{2a}$) and a second cation column 38 (notated as $C^{2b}$).

Although a total of four column sets are shown in the accompanying drawings, it is understood that in some embodiments, additional anion column sets and additional cation column sets may be utilized as may be appropriate for a given application. Or, as here, the processed effluent may be delivered to another effluent tank or pipeline as may be desired.

In another aspect, various analytical data may be collected by instrumentation positioned adjacent respective valves into each column set. More particularly, instrumentation 18 may be positioned and in data communication with the controller 14 operative communication with the piping of effluent between the effluent tank 12 and the first anion column set 20, between the first anion column set 20 and first cation column set 30, between the first cation column set 30 and second anion column set 25, and between the second anion column set 25 and second cation column set 35. The results from these intermediate readings may cause adjustments to various parameters relative to downstream resins, flow rates, and the like. Specific analytic data may include measurements concerning ph, TDS, TSS, ORP, flow rate, and the like.

Now, with further description of the regeneration process, when resin within a column requires regeneration, this regeneration takes place within the same column. Specifically, when a column's ph, ORP, and TDS exceed a user defined amount, the control system is configured to automatically actuate a respective 3-way valve to direct the water stream into the other column of a column set and prepare the one with spent resin for regeneration. The regeneration of the resin occurs automatically and under the control of the control system. In fact, the control system may place the column in need of regeneration into a 'regeneration mode' and begin the process. Resin regeneration begins with a dewatering of the column being regenerated, i.e. any water still in said column is pumped back to the settling tank 12. Then, an appropriate regeneration solution is pumped into the column being regenerated, such as from an anion regeneration solution tank 16 (a.k.a. anion reconditioning tank) or cation regeneration solution tank 17, (a.k.a. cation reconditioning tank) respectively, via piping and with respective operations of valves by the control system. The reconditioning solution may include approximately 6% solution of acid. (In the case of reconditioning the resin in the cation columns sets 30 and 35 (i.e. the second and fourth columns), the reconditioning solution may be drawn from the cation reconditioning tank 17 and may include a solution having an acidic pH.) The appropriate solution is pumped into a respective column until the resin is completely covered. Once the column is full, it is agitated such as by the distributor plates, stirrers, or ultrasonics for at least six minutes. The control system is configured to monitor the pH and ORP. Once, the defined parameters are met for a user-defined period of time, the column is ready to be put back online but not until the other column within the set finishes processing the waste stream as described above. Specifically, the regenerated column may again be dewatered and the regeneration solution is pumped back to the appropriate tank 16, 17, respectively. In a related aspect a column includes a vent to the atmosphere and the control system is configured to actuate this vent to an open configuration during a resin regeneration process.

It will be understood that the regeneration process is the same as it applies to the cation column sets described herein. Further, it is understood that the second anion columns and second cation columns will also need to regenerate their resins, respectively, in the same manners as that of the first anion column specifically described above. Accordingly, claims directed to regeneration of resin within a first anion column 32 should be interpreted to include, alternatively, regeneration of a second anion column 34 or a respective cation column or the like.

Further, the present invention evaluates the "success" or efficiency with which the contaminated water stream is being cleaned. In other words, a final set 50 of analytics data may be measured after the waste stream has passed through all of the column sets described above. The final set of data may include pH, TDS, TSS, ORP, salinity, and flow rate data.

In use, a continuous resin regeneration system 10 includes a process by which cation and anion resin is placed into a plurality of resin filtration columns over which a stream of impure or corrupted water is passed so as to undergo cleaning by ion exchanges, respectively. Each filtration column includes a two-casing set connected by a three-way valve and operable to be taken offline for resin recharging and online for continuous resin regeneration as described above. Resin recharging takes place within the column in need of recharging while the other column within the same set continuous processing a waste stream.

It is understood that while certain forms of this invention have been illustrated and described, it is not limited thereto except insofar as such limitations are included in the following claims and allowable functional equivalents thereof.

The invention claimed is:

1. A continuous resin regeneration system for use in cleaning a water stream from a contaminated water reservoir, comprising:
    a contaminated water reservoir;
    a first anion exchange resin set having a first anion exchange resin column and a second anion exchange resin column connected in parallel with the first anion exchange resin column, said first anion exchange resin column and said second anion exchange resin column of said first anion exchange resin set containing an anion exchange resin;
    a first cation exchange resin set having a first cation exchange resin column and a second cation exchange resin column connected in parallel with the first cation exchange resin column, said first cation exchange resin column and said second cation exchange resin column of said first cation exchange resin set containing a cation exchange resin;
    a first three-way control valve positioned in the water stream between the contaminated water reservoir and an upstream side of the first anion exchange resin set to alternately direct the water stream to said first anion exchange resin column of said first anion exchange resin set or to said second anion exchange resin column of said first anion exchange resin set;
    a second three-way control valve with positioned in the water
    stream adjacent a downstream side of the first anion exchange resin set to alternately direct the water stream from said first anion exchange resin column of said first anion exchange resin set toward the first cation exchange resin set or said second anion exchange resin column of said first anion exchange resin set toward the first cation exchange resin set;
    a third three-way control valve positioned in the water stream adjacently upstream of an upstream side of the first cation exchange resin set to alternately direct the water stream from the second three-way control valve to said first cation exchange resin column of said first cation exchange resin set or to said second cation exchange resin column of said first cation exchange resin set;
    a fourth three-way control valve positioned in the water stream adjacent a downstream side of the first cation exchange resin set to alternately direct the water stream from said first cation exchange column of said first cation resin set toward a downstream location or from said second cation exchange column of said first cation resin set toward a downstream location;
    a first sensor positioned in the water stream between the contaminated water reservoir and the first three-way control valve for sensing a condition of the water stream flowing from the contaminated water reservoir;
    a second sensor positioned in the water stream between the second three-way control valve and the third three-way control valve for sensing a condition of the water stream treated by one of the first anion exchange resin column and the second anion resin column:
    a third sensor positioned in the contaminated water stream adjacent a downstream side of the fourth three-way control valve for sensing a condition of the contaminated water stream treated by one of the first cation exchange resin column and the second cation exchange resin column; and
    a controller in data communication with said first sensor said second sensor and said third sensor, said controller configured to determine if a capacity for removing anions of said anion exchange resin associated with said first anion exchange resin column of said first anion exchange resin set is greater than a predetermined parameter and, if so, to actuate said first three-way control valve and said second three-way control valve to direct the water stream into said first anion exchange resin column of said first anion exchange resin set and, if not, to direct the water stream into said second anion exchange resin column of said first anion exchange resin set.

2. The continuous resin regeneration system as in claim 1, wherein said controller is configured to determine if a capacity for removing cations of said cation exchange resin associated with said first cation exchange resin column of said first cation exchange resin set is greater than a predetermined parameter and, if so, to actuate said third three way and said fourth three-way control valves to direct the water stream into said first cation column of said first cation resin set and, if not, to direct the water stream into said second cation column of said first cation resin set.

3. The continuous resin regeneration system as in claim 1, further comprising means for regenerating said first anion exchange column of said first anion exchange resin set, wherein said controller is configured to actuate said means for regenerating said first anion exchange resin column of said first anion exchange resin set when a capacity for removing anions of said anion exchange resin associated with said first anion exchange resin column of said first anion exchange resin set is not greater than a predetermined parameter and the water stream is directed into said second anion exchange resin column of said first anion exchange resin set.

4. The continuous resin regeneration system as in claim 3, wherein said means for regenerating said first anion exchange column of said first anion exchange resin set includes means for dewaterinq the first anion exchange resin column of the first anion exchange resin set such that any remnant of the water in the first anion exchange resin column is returned to the contaminated water reservoir, an anion exchange resin regeneration fluid tank containing an anion exchange resin regeneration fluid, and means for pumping the regeneration fluid from said anion exchange resin regeneration liquid tank into the first anion exchange resin column of the first anion exchange resin set, wherein said controller is configured actuate said means for dewatering the first anion column of said first anion column set,
and actuate said means for pumping the anion exchange regeneration fluid from said anion exchange resin regeneration liquid tank.

5. The continuous resin regeneration system as in claim 4, wherein said regeneration fluid from said anion exchange resin regeneration tank is completely covers the anion exchange resin associated with the first anion exchange resin column of said first anion exchange resin column set when said first anion exchange resin column is being regenerated and said anion exchange regeneration fluid is pumped into said first anion exchange resin column.

6. The continuous resin regeneration system as in claim 1, further comprising means for regenerating said first cation exchange column of said first cation exchange resin set, wherein said controller is configured to actuate said means for regenerating said first cation exchange resin column of said first cation exchange resin set when a capacity for removing cations of said cation exchange resin associated with said first cation exchange resin column of said first cation exchange resin set is not greater than a predetermined parameter and the water stream is directed into said second cation exchange resin column of said first cation exchange resin set.

7. The continuous resin regeneration system as in claim 6, wherein said means for regenerating said first cation exchange column of said first cation exchange resin set includes means for dewatering the first cation exchange resin column of the first cation exchange resin set such that any remnant of the water in the first cation exchange resin column is returned to the contaminated water reservoir, a cation resin regeneration fluid tank containing a cation exchange regeneration fluid, and means for pumping the cation exchange resin regeneration fluid from said cation exchange resin regeneration fluid tank into the first cation exchange resin column of the first cation exchange resin set, wherein said controller is configured to actuate said means for dewatering the first cation column of said first cation column set and actuate said means for pumping the cation exchange regeneration fluid from said cation exchange resin regeneration liquid tank.

8. The continuous resin regeneration system as in claim 7, wherein said cation exchange resin regeneration fluid from said cation exchange resin regeneration tank completely covers the cation exchange resin associated with said first cation exchange resin column of said first cation exchange column set when said first cation exchange resin column is being regenerated and said cation exchange resin regeneration fluid is pumped into said first cation exchange resin column.

9. The continuous resin regeneration system as in claim 7, said first sensor and said second sensor being operable to generate analytic data indicative of at least one of pH, total dissolved solids (TDS), total suspended solids (TSS), oxidation reduction potential (ORP), and flow rate of the water stream.

10. The continuous resin regeneration system as in claim 9, wherein said controller is configured to utilize said analytic data generated by said at least one of the first sensor and said second sensor to determine if said anion exchange resin associated with said first anion exchange resin column needs to be regenerated.

* * * * *